Sept. 15, 1970  J. HORNSTRA ET AL  3,529,159
SEMICONDUCTOR DEVICE FOR DETECTING AND/OR MEASURING RADIATION
Filed Feb. 28, 1967  2 Sheets-Sheet 2

INVENTORS
JAN HORNSTRA
RENE VAN DANTZIG
DIRK P. OOSTHOEK
BY
AGENT

3,529,159
SEMICONDUCTOR DEVICE FOR DETECTING AND/OR MEASURING RADIATION
Jan Hornstra, Emmasingel, Eindhoven, and René van Dantzig and Dirk Pieter Oosthoek, Amsterdam, Netherlands, assignors, by mesne assignments, to U.S. Philips Corporation, New York, N.Y., a corporation of Delaware
Filed Feb. 28, 1967, Ser. No. 619,466
Claims priority, application Netherlands, Mar. 1, 1966, 6602606
Int. Cl. G01t 1/24
U.S. Cl. 250—83          5 Claims

ABSTRACT OF THE DISCLOSURE

A semiconductor detector employing a single crystal disc of semiconductor material having a diamond crystal structure, wherein the crystal is cut such that the normal to the disc is oriented, within 5°, in an irrational direction which deviates by an angle of 1° from the [432]-direction towards the [111]-direction.

---

The invention relates to a semiconductor device for detecting and/or measuring radiation, particularly radiation of energetically charged particles, said device comprising a single crystal disc of semiconductor material of diamond crystal structure, the two opposite major surfaces of said disc being provided with electrodes. It should be noted that the term "diamond crystal structure" is to denote herein not only crystals having only one type of atoms, but also crystals having two types of atoms, as in the zinc blend structure, or even more than two types of atoms. Such a device, hereinafter termed particle detector, is, in general, intended for being connected by its electrodes to a voltage such that a depletion layer is formed between the electrodes and to be arranged in the path(s) of the particles to be detected so that the particles strike the disc approximately at right angles. When the detector is struck by a particle, the latter will supply a given quantity of energy, so that the charge released in the form of electrons and holes can be measured as a pulse in the circuit connected to the electrodes.

In general, it has been common practice to saw the discs of semiconductor material, usually silicon or germanium, from a single crystal bar pulled in the [111]-direction in a direction normal to the axis of the bar, mainly because for purely technological considerations such bars can be manufactured easier than bars pulled up in other directions. Wegner, Erginsoy and Gibson in I.E.E.E. Trans. Nuclear Science NS–12, February 1965, pages 240–246, have pointed out that there is a considerable scattering or stray in the energy given off by incident particles. This has been attributed to the potential coincidence of the direction of radiation of the particles with the direction of channels in the lattice of the semiconductor material, so that a particle incident in a direction coinciding with the direction of a channel was believed to give off less energy than a particle not being incident in that direction. In connection herewith it was suggested to cut the discs from a bar in a manner such that the direction of the particles could not coincide with a crystal plane of low indices, for example with the (110)-, (111)- and (100)- planes. These authors recommended to cut the discs in a direction at right angles to an axis turned through about 20° with respect to the [100]-axis towards the direction of the [110]-axis and through about 8° with respect to the [110]-axis towards the [111]-axis, it being expected that in this case scattering in the energy given off by the particles would be small, even if the directions of incidence of the particles on the disc should exhibit departures up to about 5° from the normal to the disc.

Although the problem involved might thus be solved, another inconvenience comes up, that is to say, such discs have to be cut in a direction at right angles to a line which is at an angle of about 35° to the axis of a bar pulled up in the [111]-direction. Thus a fairly great quantity of material gets lost at each end of the bar. Moreover, the discs sawed obliquely from the bar have a definitely elliptical shape. If these discs have to match the conventional circular shape of the particle detectors material would again get lost, while an additional operation would be required, which involves a risk of damage of the discs. It should be noted here that the semiconductor material used for such detectors has to be exertmely pure, so that it is still much more expensive than the material used for example for the manufacture of transistors.

The invention has for its object inter alia to obviate these disadvantages.

According to the invention, the normal to the disc is orientated in an irrational direction which deviates by an angle of 1° from the [432]-direction of the single crystal towards the [111]-direction, the maximum deviation around said irrational direction being 5°. This means that, when the direction of incidence of the particles is exactly normal to the semiconductor disc, an angle up to 5° between the disc orientation or normal to the disc and the direction 1° from the [432]-direction towards the [111]-direction is tolerable and within the scope of our invention. A calculation shows that with discs thus orientated the energy given off by particles incident in directions not deviating too far from the normal exhibits only little differences. If it has to be expected in connection with the use of the particle detector that he particles will not all be incident in the same direction and that differences of, for example, 3° may occur, said maximum deviation from the irrational direction is preferably chosen not to exceed 2°. If still greater deviations have to be expected up to for example 5°, the normal to the disc is preferably caused to substantially coincide with said irrational direction.

Such discs have to be cut from a bar pulled up in the [111]-direction at right angles to a line which is at an angle of about 14° to the axis of the bar. The elliptical shape of these discs is so slight that the difference between the long axis and the short axis is only a few percent. Cutting involves only a small loss of material at the ends of the bar and the discs may usually be mounted in the conventional holders without correction of the shape and hence without further loss of material.

The invention will now be described more fully with reference to an embodiment shown in the figures.

Figure 1:
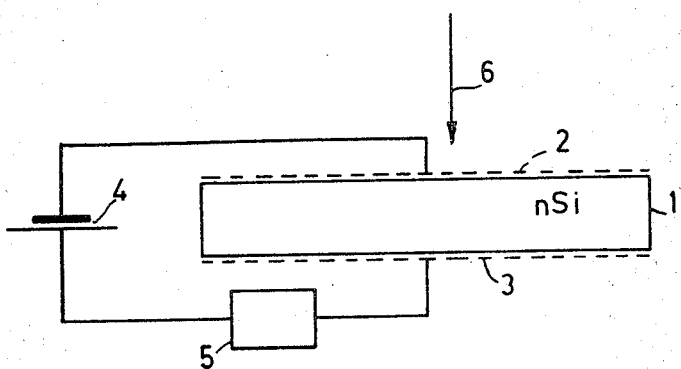
FIG. 1 is a diagrammatic sectional view of a particle detector and shows, in addition, the electrical circuit to be connected thereto.

The particle detector shown in FIG. 1 comprises a single crystal disc 1 of n-type silicon having a resistivity of the order of 5000 ohm cm. The upper side is provided by vapour deposition with an electrode 2 of pure gold, indicated by broken lines, and the lower side is provided by vapour deposition with an electrode 3 of pure aluminum, also indicated by broken lines. On the very high ohmic silicon the gold electrode forms a Schottky junction, whereas the electrode 3 has an ohmic character. The electrode compositions are not critical, and many other materials can be used. These electrodes have connected to them a circuit including a voltage source 4, the voltage of which is controlled so that the depletion layer formed at the electrode 2 occupies substantially the whole space between the electrodes. The thickness of the disc is not essential for this invention. For the purpose aimed at discs of a thickness between 25 and 300μ are usually employed. The circuit includes furthermore a measuring device 5 for counting and/or analysing the pulses produced by the incidence of energetic charged particles, for example, alpha particles, deuterons and protons, which strike the electrode 2 in the direction of the arrow 6 and penetrate into the disc.

The disc 1 was sawed from a single crystal bar manufactured in a conventional manner not essential for this invention and having a diameter of 25 mms. The axis of the bar was, as usual with such bars, orientated in the [111]-direction of the crystal lattice.

Figure 2:
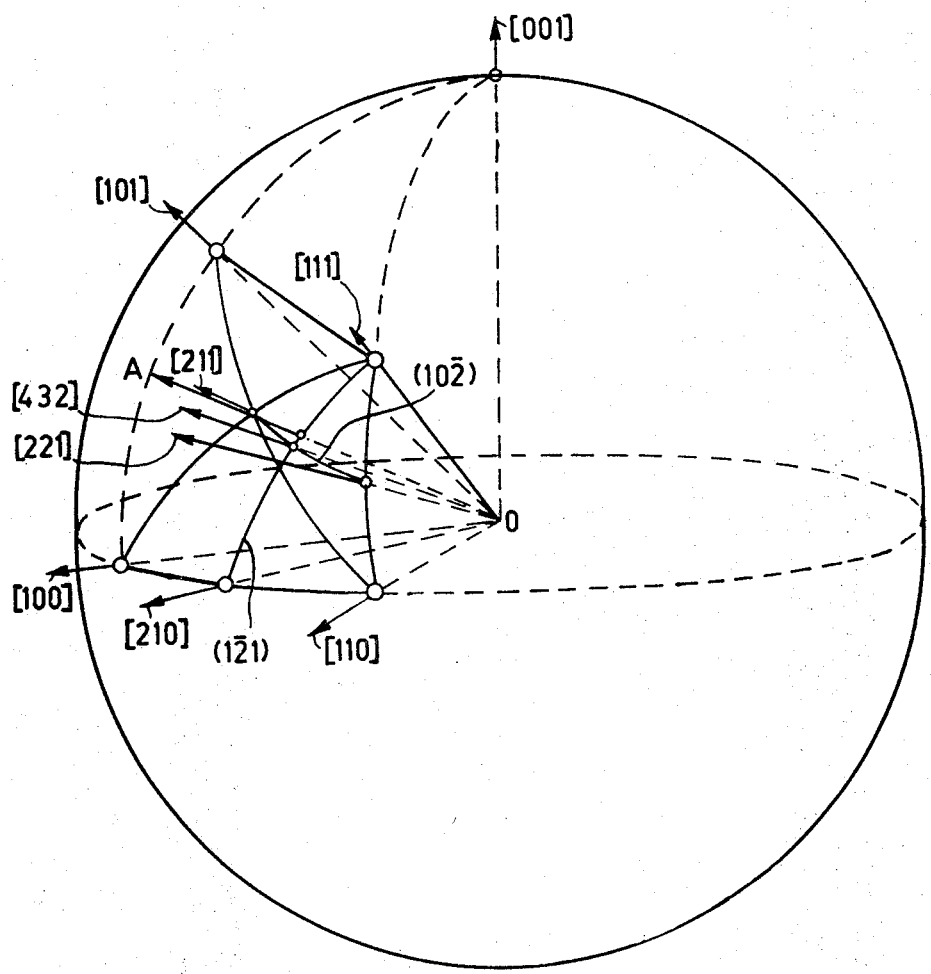
FIG. 2 illustrates diagrammatically the orientation of the semiconductor disc used in the particle detector according to the invention.

The position in which the disc was sawed from the bar is indicated in FIG. 2. This figure shows perspectively an imaginary sphere around a silicon crystal. From the centre O lines are drawn parallel to different crystal directions, for example the lines indicated by [111], [100] and [110]. There are furthermore drawn the sections of crystal planes with the sphere, for example, of the $(1\bar{2}1)$-, $(10\bar{2})$-planes. The [432]-direction is the line of intersection of the $(1\bar{2}1)$-plane with the $(10\bar{2})$-plane. The aforesaid irrational direction then lies in the $(1\bar{2}1)$-plane offset through an angle of 1° towards the [111]-axis. It is designated by A.

Figure 3:
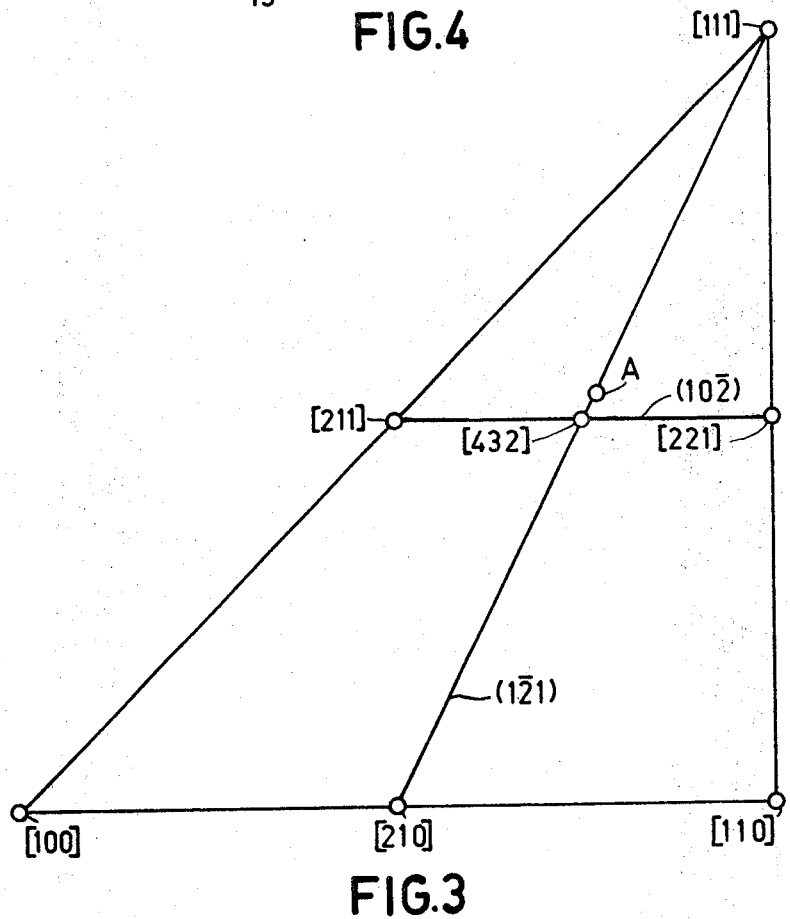
FIG. 3 illustrates the same orientation with reference to a gnomonic projection.

In the gnomonic projection of FIG. 3, in which [100] is the centre, a few crystal directions are indicated and the said irrational direction is again designated by A.

Figure 4:
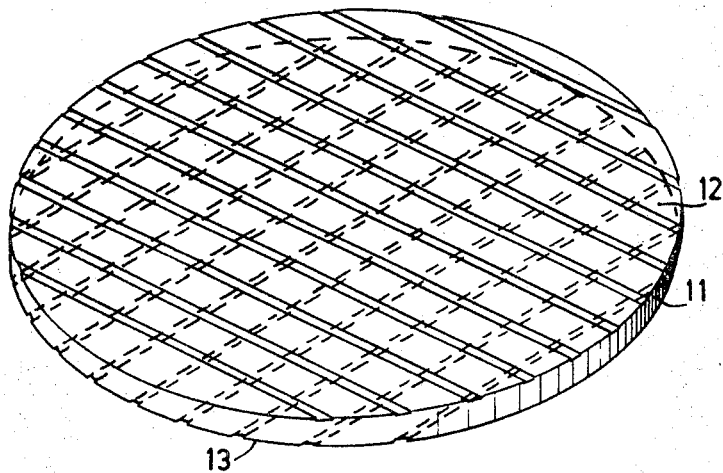
FIG. 4 is a perspective view of a particle detector having multiple electrodes.

FIG. 4 illustrates the use of the invention in a particle detector intended for identifying the orientation of particles incident at different places of the detector in a simple manner. The crossed striped electrode detector as such hereinafter described is not our invention but the joint invention of one of us, D. P. Oosthoek, and a colleague E. Kok, which is the subject matter of a copending application Ser. No. 619,465, filed Feb. 28, 1967. We use the detector to illustrate an excellent application for our newly oriented crystal. This detector comprises a disc of semiconductor material 11, the upper major face of which is provided by vapour deposition with a number of parallel strips 12 of pure gold. To the lower side is applied by vapour deposition a number of parallel strips 13 of pure aluminum. The strips are insulated from each other by uncoated paths of a width of about 100μ. During the vapour deposition a grating of parallel, thin metal wires was put on the disc and the source of the metal to be evaporated was formed by a wire parallel to the wires of the grating and stretched at a given distance over the former in order to avoid shadows caused by parallax. The various strips of the upper and lower sides may be connected to a device (not shown). This measuring device may record apart from other data at what places the particle strikes the disc, since the pulse produced at the impact appears only in those strips 12 and 13 which cross each other at the point of incidence. Owing to the orientation of the crystal lattice of the disc according to the invention the pulses will exhibit little difference in value whether the particles are incident at the centre of the disc or at the edge thereof, in spite of the different directions of incidence of said particles. As a matter of course said directions should not exhibit an excessive difference. By using a collimator inhibiting the diameter of the beam of incident particles at a sufficient distance from the disc, for example, at a distance of 80 mms. with a beam diameter of 2 mms., it can be easily ensured that the direction in which the peripheral zone of the disc is struck does not differ by more than about 5° from the direction in which the particles strike the centre of the disc. The latter direction will, of course, usually coincide with the normal to the disc.

What is claimed is:

1. A semiconductor device for detecting radiation of energetically charged particles comprising a single crystal disc of a semiconductor material of diamond structure and electrodes on the two opposite major surfaces of said disc, said single crystal being cut such that the normal to the disc is oriented within 5° in an irrational direction which deviates by an angle of 1° from the [432]-direction of the single crystal towards the [111]-direction.

2. A semiconductor device as claimed in claim 1 wherein the maximum deviation of the normal to the disc relative to the said irrational direction does not exceed 2°.

3. A semiconductor device as claimed in claim 2 wherein the normal to the disc substantially coincides with said irrational direction, and the disc is oriented such that incident radiation strikes the disc in a direction coincident with the normal plus or minus 5°.

4. A semiconductor device as set forth in claim 1 wherein one electrode forms a rectifying connection to the crystal and the other electrode forms an ohmic connection.

5. A semiconductor device as set forth in claim 4 wherein each of the electrodes is subdivided into a plurality of parallel, strip-shaped, mutually-insulated electrode portions, the electrode portions of one electrode crossing over the electrode portions of the other electrode.

References Cited

Wegner, Erginsoy, and Gibson, I.E.E.E. Trans. on Nuclear Science, NS–12, February 1965, pp. 240–246.

RALPH G. NILSON, Primary Examiner

D. L. WILLIS, Assistant Examiner

U.S. Cl. X.R.
23—301; 250—83.3